(12) United States Patent
Yu et al.

(10) Patent No.: US 10,965,246 B2
(45) Date of Patent: Mar. 30, 2021

(54) SHUTDOWN CONTROL SYSTEM AND METHOD

(71) Applicant: SUNGROW POWER SUPPLY CO., LTD., Anhui (CN)

(72) Inventors: Yanfei Yu, Anhui (CN); Hua Ni, Anhui (CN); Zongjun Yang, Anhui (CN); Huajin Chen, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/579,639

(22) Filed: Sep. 23, 2019

(65) Prior Publication Data

US 2020/0106272 A1 Apr. 2, 2020

(30) Foreign Application Priority Data

Sep. 28, 2018 (CN) .......................... 201811141113.8

(51) Int. Cl.
*H02J 1/00* (2006.01)
*H02J 3/00* (2006.01)
(Continued)

(52) U.S. Cl.
CPC .............. *H02S 40/34* (2014.12); *H02J 1/10* (2013.01); *H02J 3/32* (2013.01); *H02J 3/383* (2013.01);
(Continued)

(58) Field of Classification Search
CPC .......... H02S 40/32; H02S 40/30; H02S 40/34; H02S 40/36; H02J 3/383; H02J 3/46;
(Continued)

(56) References Cited

U.S. PATENT DOCUMENTS 7,408,268 B1* 8/2008 Nocentini ................. H02J 3/38
307/16
7,900,361 B2 3/2011 Adest et al.
(Continued)

FOREIGN PATENT DOCUMENTS

| CN | 105244905 A | 1/2016 |
|---|---|---|
| CN | 106877311 A | 6/2017 |
| CN | 107276113 A | 10/2017 |

OTHER PUBLICATIONS

First Chinese Office Action regarding Application No. 201811141113.8 dated Dec. 24, 2019. English translation provided by Unitalen Attorneys at Law.
(Continued)

*Primary Examiner* — Daniel J Cavallari
*Assistant Examiner* — Rasem Mourad
(74) *Attorney, Agent, or Firm* — Harness, Dickey & Pierce, P.L.C.

(57) ABSTRACT

A shutdown control system and a shutdown control method are provided. A shutdown unit is a series circuit of multiple shutdown circuits connected in series or a series-parallel circuit of multiple such series circuits connected in parallel. Each shutdown circuit is connected to at least one direct current power supply. A SCU periodically transmits a first communication signal until receiving a first user command. A TCU controls states of a electrical energy transforming unit to control the operation state of a power generation system. Each PCU determines whether the first communication signal is received during a preset time period and whether the distributed power generation system operates in a power generation state, and controls a corresponding shutdown circuit to operate in a normal operation mode if at least one of the conditions is met; and otherwise operate in a security mode.

12 Claims, 3 Drawing Sheets

(51) Int. Cl.
*H02S 40/34* (2014.01)
*H02J 1/10* (2006.01)
*H02J 3/32* (2006.01)
*H02J 3/38* (2006.01)
*H02S 40/36* (2014.01)
*H02S 40/32* (2014.01)
*H02M 1/00* (2006.01)

(52) U.S. Cl.
CPC .............. *H02S 40/32* (2014.12); *H02S 40/36* (2014.12); *H02J 2300/24* (2020.01); *H02M 2001/0077* (2013.01)

(58) Field of Classification Search
CPC .. H02J 1/10; H02J 3/32; H02J 2300/24; H02J 13/00004; H02J 13/00034; H02J 1/102; H02J 1/00; Y02E 10/563; Y02E 10/50; Y02E 10/76; Y02E 40/70; Y02E 10/56; Y04S 10/123
See application file for complete search history.

(56) References Cited

U.S. PATENT DOCUMENTS

| | | | |
|---|---|---|---|
| 8,004,117 B2 | 8/2011 | Adest et al. | |
| 8,013,472 B2 | 9/2011 | Adest et al. | |
| 8,049,523 B2 | 11/2011 | Gazit | |
| 8,289,742 B2 | 10/2012 | Adest et al. | |
| 8,319,471 B2 | 11/2012 | Adest et al. | |
| 8,324,921 B2 | 12/2012 | Adest et al. | |
| 8,333,429 B2 | 12/2012 | Nelson et al. | |
| 8,384,243 B2 | 2/2013 | Adest et al. | |
| 8,473,250 B2 | 6/2013 | Adest et al. | |
| 8,531,055 B2 | 9/2013 | Adest et al. | |
| 8,587,151 B2 | 11/2013 | Adest et al. | |
| 8,599,588 B2 | 12/2013 | Adest et al. | |
| 8,618,692 B2 | 12/2013 | Adest et al. | |
| 8,659,188 B2 | 2/2014 | Adest et al. | |
| 8,773,092 B2 | 7/2014 | Fishelov et al. | |
| 8,777,307 B2 | 7/2014 | Nelson et al. | |
| 8,816,535 B2 | 8/2014 | Adest et al. | |
| 8,903,681 B2 | 12/2014 | Adest et al. | |
| 8,947,194 B2 | 2/2015 | Sella et al. | |
| 8,963,369 B2 | 2/2015 | Sella et al. | |
| 9,041,339 B2 | 5/2015 | Adest et al. | |
| 9,088,178 B2 | 7/2015 | Adest et al. | |
| 9,112,379 B2 | 8/2015 | Sella et al. | |
| 9,130,401 B2 | 9/2015 | Adest et al. | |
| 9,291,696 B2 | 3/2016 | Adest et al. | |
| 9,368,964 B2 | 6/2016 | Adest et al. | |
| 9,407,161 B2 | 8/2016 | Adest et al. | |
| 9,537,445 B2 | 1/2017 | Adest et al. | |
| 9,543,889 B2 | 1/2017 | Sella et al. | |
| 9,590,526 B2 | 3/2017 | Adest et al. | |
| 9,644,993 B2 | 5/2017 | Adest et al. | |
| 9,673,711 B2 | 6/2017 | Fishelov et al. | |
| 9,680,304 B2 | 6/2017 | Adest et al. | |
| 9,831,824 B2 | 11/2017 | Gazit | |
| 9,853,490 B2 | 12/2017 | Adest et al. | |
| 9,853,538 B2 | 12/2017 | Adest et al. | |
| 9,869,701 B2 | 1/2018 | Sella et al. | |
| 9,948,233 B2 | 4/2018 | Adest et al. | |
| 9,960,667 B2 | 5/2018 | Adest et al. | |
| 9,960,731 B2 | 5/2018 | Sella et al. | |
| 9,966,766 B2 | 5/2018 | Adest et al. | |
| 9,979,280 B2 | 5/2018 | Adest et al. | |
| 10,097,007 B2 | 10/2018 | Adest et al. | |
| 10,116,217 B2 | 10/2018 | Fishelov et al. | |
| 10,184,965 B2 | 1/2019 | Adest et al. | |
| 10,230,245 B2 | 3/2019 | Adest et al. | |
| 10,447,150 B2 | 10/2019 | Adest et al. | |
| 10,461,687 B2 | 10/2019 | Adest et al. | |
| 10,516,336 B2 | 12/2019 | Fishelov et al. | |
| 2007/0164612 A1* | 7/2007 | Wendt | H02J 3/02 307/45 |
| 2008/0097655 A1* | 4/2008 | Hadar | H02J 13/00028 700/286 |
| 2008/0136367 A1 | 6/2008 | Adest et al. | |
| 2008/0143188 A1 | 6/2008 | Adest et al. | |
| 2008/0144294 A1 | 6/2008 | Adest et al. | |
| 2008/0147335 A1 | 6/2008 | Adest et al. | |
| 2008/0150366 A1 | 6/2008 | Adest et al. | |
| 2008/0164766 A1 | 7/2008 | Adest et al. | |
| 2009/0039852 A1 | 2/2009 | Fishelov et al. | |
| 2009/0140715 A1 | 6/2009 | Adest et al. | |
| 2009/0141522 A1 | 6/2009 | Adest et al. | |
| 2009/0145480 A1 | 6/2009 | Adest et al. | |
| 2009/0146667 A1 | 6/2009 | Adest et al. | |
| 2009/0146671 A1 | 6/2009 | Gazit | |
| 2009/0147554 A1 | 6/2009 | Adest et al. | |
| 2009/0206666 A1 | 8/2009 | Sella et al. | |
| 2010/0139734 A1* | 6/2010 | Hadar | H01L 31/052 136/244 |
| 2010/0301991 A1 | 12/2010 | Sella et al. | |
| 2011/0084553 A1 | 4/2011 | Adest et al. | |
| 2011/0121652 A1 | 5/2011 | Sella et al. | |
| 2011/0125431 A1 | 5/2011 | Adest et al. | |
| 2011/0140536 A1 | 6/2011 | Adest et al. | |
| 2011/0273015 A1 | 11/2011 | Adest et al. | |
| 2011/0273016 A1 | 11/2011 | Adest et al. | |
| 2011/0291486 A1 | 12/2011 | Adest et al. | |
| 2012/0007394 A1 | 1/2012 | Nelson et al. | |
| 2012/0007613 A1 | 1/2012 | Gazit | |
| 2012/0086245 A1 | 4/2012 | Nelson et al. | |
| 2012/0139343 A1* | 6/2012 | Adest | G01S 3/7861 307/43 |
| 2012/0175963 A1 | 7/2012 | Adest et al. | |
| 2012/0212066 A1 | 8/2012 | Adest et al. | |
| 2012/0248863 A1 | 10/2012 | Adest et al. | |
| 2012/0319490 A1 | 12/2012 | Adest et al. | |
| 2013/0043839 A1 | 2/2013 | Adest et al. | |
| 2013/0054041 A1 | 2/2013 | Fishelov et al. | |
| 2013/0193945 A1 | 8/2013 | Adest et al. | |
| 2013/0207469 A9 | 8/2013 | Sella et al. | |
| 2013/0332093 A1 | 12/2013 | Adest et al. | |
| 2014/0049115 A1 | 2/2014 | Adest et al. | |
| 2014/0119075 A1 | 5/2014 | Adest et al. | |
| 2014/0152240 A1 | 6/2014 | Adest et al. | |
| 2014/0233286 A1 | 8/2014 | Adest et al. | |
| 2014/0320101 A1 | 10/2014 | Fishelov et al. | |
| 2014/0321175 A1 | 10/2014 | Adest et al. | |
| 2015/0100257 A1 | 4/2015 | Adest et al. | |
| 2015/0115984 A1 | 4/2015 | Sella et al. | |
| 2015/0155825 A1 | 6/2015 | Sella et al. | |
| 2015/0288330 A1 | 10/2015 | Sella et al. | |
| 2015/0303711 A1 | 10/2015 | Adest et al. | |
| 2015/0333692 A1 | 11/2015 | Adest et al. | |
| 2016/0079916 A1 | 3/2016 | Adest et al. | |
| 2016/0164456 A1 | 6/2016 | Adest et al. | |
| 2016/0241079 A1 | 8/2016 | Adest et al. | |
| 2016/0373006 A9 | 12/2016 | Adest et al. | |
| 2017/0141679 A1 | 5/2017 | Adest et al. | |
| 2017/0179877 A1 | 6/2017 | Sella et al. | |
| 2017/0212158 A1 | 7/2017 | Adest et al. | |
| 2017/0214363 A1 | 7/2017 | Adest et al. | |
| 2017/0222542 A1 | 8/2017 | Adest et al. | |
| 2017/0250541 A1 | 8/2017 | Adest et al. | |
| 2017/0271875 A1 | 9/2017 | Narla | |
| 2017/0288408 A1 | 10/2017 | Kim et al. | |
| 2017/0294780 A1 | 10/2017 | Adest et al. | |
| 2017/0317523 A1 | 11/2017 | Adest et al. | |
| 2017/0324330 A1 | 11/2017 | Fishelov et al. | |
| 2017/0373590 A1 | 12/2017 | Adest et al. | |
| 2018/0034269 A1 | 2/2018 | Adest et al. | |
| 2018/0166974 A1 | 6/2018 | Adest et al. | |
| 2018/0210016 A1 | 7/2018 | Sella et al. | |
| 2018/0226807 A1 | 8/2018 | Adest et al. | |
| 2018/0234049 A1 | 8/2018 | Adest et al. | |
| 2019/0013777 A9 | 1/2019 | Adest et al. | |
| 2019/0036455 A1 | 1/2019 | Fishelov et al. | |
| 2019/0080346 A1 | 3/2019 | Sella et al. | |
| 2019/0097531 A1 | 3/2019 | Adest et al. | |
| 2019/0123564 A1 | 4/2019 | Adest et al. | |
| 2019/0146016 A1 | 5/2019 | Adest et al. | |

(56) References Cited

U.S. PATENT DOCUMENTS

| | | |
|---|---|---|
| 2019/0149036 A1 | 5/2019 | Adest et al. |
| 2019/0149037 A1 | 5/2019 | Adest et al. |
| 2019/0173424 A1 | 6/2019 | Adest et al. |
| 2019/0326758 A1* | 10/2019 | Zhu .................. H02M 3/33569 |
| 2019/0326759 A1 | 10/2019 | Adest et al. |
| 2019/0326854 A1 | 10/2019 | Adest et al. |
| 2019/0379279 A1 | 12/2019 | Adest et al. |

OTHER PUBLICATIONS

"National Electrical Code 2017", National Fire Protection Association; Quincy, Massachusetts; 2016.
"MODBUS Application Protocol Specification"; May 2002; http://www.modbus.org.
Second Chinese Office Action regarding Application No. 201811141113.8 dated May 26, 2020. English translation provided by Unitalen Attorneys at Law.

* cited by examiner

SHUTDOWN CONTROL SYSTEM AND METHOD

The present application claims priority to Chinese Patent Application No. 201811141113.8, titled "SHUTDOWN CONTROL SYSTEM AND METHOD", filed on Sep. 28, 2018 with the Chinese Patent Office, which is incorporated herein by reference in its entirety.

FIELD

The present disclosure relates to the technical field of electrical shock protection, and in particular to a shutdown control system and a shut down control method.

BACKGROUND

In a distributed power generation system, a signal direct current power supply cannot supply enough voltage and power to meet actual demand. Therefore, multiple direct current power supplies are connected in series-parallel to meet design needs. However, since the multiple direct current power supplies are connected in series-parallel, a total output voltage value may be up to hundreds or thousands of volts. When a worker is close to the distributed power generation system, a severe electric shock accident may occur.

In an existing solution of electrical shock protection, each of the multiple direct current power supplies is provided with a shutdown circuit. When a worker is close to the distributed power generation system, a host device is manually triggered to transmit a shutdown instruction, so as to control all the shutdown circuits to disconnect the corresponding direct current power supply, such that the total output voltage of the multiple direct current power supplies connected in series-parallel falls within a security voltage range. However, a fault may occur in a communication link of this solution in practices. For example, a communication signal may be absorbed or blocked. As a result, some shutdown circuits cannot receive the shutdown instruction, thereby failing to disconnect the direct current power supply. In view of the above, the following improvements are made to this solution. The host device further transmits a heartbeat signal to each shutdown circuit. Once a shutdown circuit does not receive the heartbeat signal from the host device, the shutdown circuit knows that the communication link is broken, and then disconnects the corresponding direct current power supply directly.

In the improved solution, it is ensured that the direct current power supply is disconnected when the communication link is broken. However, this improved solution has a problem that, the direct current power supply may be frequently disconnected in a case that a temporary or random abnormal condition occurs multiple times in the communication link, which severely affects the usability of the distributed power generation system.

SUMMARY

In view of above, a shutdown control system and a shutdown control method are provided in the present disclosure, to improve the usability of a distributed power generation system having a function of electrical shock protection.

A shutdown control system is provided, which includes a main circuit and a control circuit.

The main circuit includes an electrical energy transforming unit and a shutdown unit that are connected to a direct current bus. The shutdown unit is a series circuit formed by connecting output ends of multiple shutdown circuits in series. Alternatively, the shutdown unit is a series-parallel circuit formed by connecting output ends of multiple shutdown circuits in series to form a series circuit and connecting output ends of multiple such series circuits in parallel. An input end of each of the multiple shutdown circuits is connected to at least one of direct current power supplies in the distributed power generation system. When the electrical energy transforming unit operates in a turned-on state, the distributed power generation system operates in a power generation state, and when the electrical energy transforming unit operates in a turned-off state, the distributed power generation system operates in a shutdown state.

The control circuit includes a system control unit (SCU), a transformation control unit (TCU) and multiple power source control units (PCU) corresponding to the multiple shutdown circuits.

The SCU is configured to periodically transmit a first communication signal. The SCU stops transmitting the first communication signal when receiving a first user command.

The TCU is configured to control the turned-on state and the turned-off state of the electrical energy transforming unit.

Each of the multiple PCUs is configured to determine whether a first condition that the PCU receives the first communication signal from the SCU during a preset time period is met and whether a second condition that the distributed power generation system operates in the power generation state is met. If determining that at least one of the first condition and the second condition is met, the PCU is configured to control a shutdown circuit corresponding to the PCU to operate in a normal operation mode. If determining that none of the first condition and the second condition is met, the PCU is configured to control the shutdown circuit corresponding to the PCU to operate in a security mode.

In the security mode, an output voltage of the shutdown circuit is limited, to allow an output voltage of the series circuit to fall within a security voltage range. The normal operation mode is a mode other than the security mode.

In an embodiment, the first communication signal is used to request a response communication signal from the PCU.

In an embodiment, the SCU is further configured to transmit a second communication signal after stopping transmitting the first communication signal. The second communication signal is used to request a response communication signal from the PCU.

In an embodiment, each of the multiple PCUs is further configured to control the shutdown circuit corresponding to the PCU to operate in the security mode if determining that the distributed power generation system is in the shutdown state and the PCU receives the second communication signal.

In an embodiment, each of the multiple PCUs is configured to control the shutdown circuit corresponding to the PCU to operate in the security mode by a way of:

controlling a voltage value of the input end of the shutdown circuit to be equal to an open circuit voltage value of a direct current power supply connected to the input end of the shutdown circuit; or controlling a current value of the input end of the shutdown circuit to be equal to a short circuit current value of a direct current power supply connected to the input end of the shutdown circuit; or controlling the input end of the shutdown circuit to be disconnected from an output end of the shutdown circuit; or controlling the shutdown circuit to be turned off; or controlling a voltage value of the input end or an output end of the shutdown circuit to be equal to a nonzero constant value; or controlling a voltage value of the input end or an output end of the shutdown circuit to periodically change in a preset range.

In an embodiment, each of the multiple shutdown circuits includes a switch and a diode. The diode is connected to an output end of the shutdown circuit in reverse-parallel. The switch is connected between the input end and the output end of the shutdown circuit. Alternatively, the switch is connected to the input end or the output end of the shutdown circuit in parallel.

Alternatively, each of the multiple shutdown circuits is a direct current/direct current (DC/DC) converter.

In an embodiment, the electrical energy transforming unit may be an existing inverter or an existing energy storage converter in the distributed power generation system.

In an embodiment, each of the multiple PCUs is configured to determine that the distributed power generation system is in the shutdown state by determining that:

an output current value or an output power value of each of the direct current power supplies is equal to zero; or a voltage value of each of the direct current power supplies is equal to an open circuit voltage value of the direct current power supply; or an output current value or an output power value of the shutdown circuit corresponding to the PCU is equal to zero; or a voltage value of the output end of the shutdown circuit corresponding to the PCU is equal to an output open circuit voltage value of the shutdown circuit; or an intensity of a voltage or a current having a predetermined frequency at the output end of the shutdown circuit corresponding to the PCU is less than a preset value; or a predetermined time-domain mutation feature occurs in an output voltage or an output current of the shutdown circuit corresponding to the PCU.

A shutdown control method applied to a shutdown control system is provided. The shutdown control system includes a main circuit and a control circuit.

The main circuit includes an electrical energy transforming unit and a shutdown unit that are connected to a direct current bus. The shutdown unit is a series circuit formed by connecting output ends of multiple shutdown circuits in series. Alternatively, the shutdown unit is a series-parallel circuit formed by connecting output ends of multiple shutdown circuits in series to form a series circuit and connecting output ends of multiple such series circuits in parallel. An input end of each of the multiple shutdown circuits is connected to at least one of direct current power supplies in a distributed power generation system. When the electrical energy transforming unit operates in a turned-on state, the distributed power generation system operates in a power generation state, and when the electrical energy transforming unit operates in a turned-off state, the distributed power generation system operates in a shutdown state.

The control circuit includes a system control unit (SCU), a transformation control unit (TCU) and multiple power source control units (PCU) corresponding to the multiple shutdown circuits. The SCU is configured to periodically transmit a first communication signal. The SCU stops transmitting the first communication signal when receiving a first user command. The TCU is configured to control the turned-on state and the turned-off state of the electrical energy transforming unit.

The shutdown control method includes: determining, by each of the multiple PCUs, whether a first condition that the PCU receives the first communication signal from the SCU during a preset time period is met and whether a second condition that the distributed power generation system operates in the power generation state is met; controlling, by the PCU, a shutdown circuit corresponding to the PCU to operate in a normal operation mode if determining that at least one of the first condition and the second condition is met; and controlling, by the PCU, the shutdown circuit corresponding to the PCU to operate in a security mode if determining that none of the first condition and the second condition is met.

In the security mode, an output voltage of the shutdown circuits is limited, to allow an output voltage of the series circuit to fall within a security voltage range. The normal operation mode is a mode other than the security mode.

In an embodiment, the SCU transmits a second communication signal after stopping transmitting the first communication signal. Each of the first communication signal and the second communication signal is used to request a response communication signal from the PCU.

It can be seen from the above technical solutions, The PCU not only determines the target operation mode of the shutdown circuit corresponding to the PCU based on the first communication signal transmitted from the SCU, but also properly determines the target operation state of the shutdown circuit corresponding to the PCU based on an operation state of the distributed power generation system in a case that the PCU fails to receive the first communication signal due to a broken communication link. If it is determined that the distributed power generation system is in the shutdown state, the shutdown circuit is controlled to operate in the security mode, so as to eliminate a risk of electric shock. If it is determined that the distributed power generation system operates in the power generation state, the shutdown circuit is controlled to operate in the normal operation mode, so as to ensure the usability of the distributed power generation system. In this way, the usability of the distributed power generation system is significantly improved compared with the case that the shutdown circuit is directly controlled to operate in the security mode once the communication link is broken.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

Hereinafter, technical solutions in the embodiments of the present disclosure are clearly and completely described with reference to the drawings in the embodiments of the present disclosure. It is apparent that the embodiments described herein are only parts not all embodiments of the present disclosure. Based on the embodiments of the present disclosure, all of other embodiments obtained by those skilled in the art without any creative work should fall within the scope of protection of the present disclosure.

Figure 1:
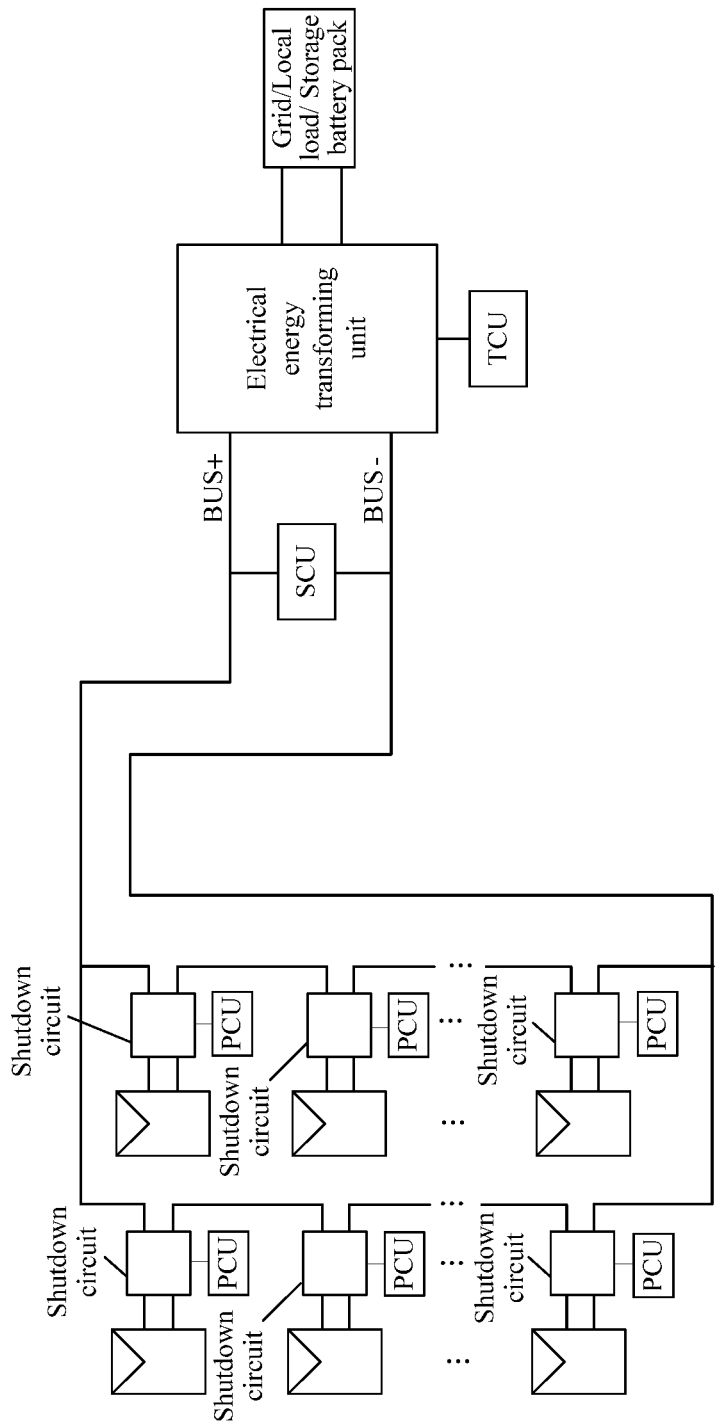
FIG. 1 is a schematic structural diagram of a shutdown control system according to an embodiment of the present disclosure.

Referring to FIG. 1, a shutdown control system applied to a distributed power generation system is provided according to an embodiment of the present disclosure. The shutdown control system includes a main circuit and a control circuit. The main circuit includes an electrical energy transforming unit and a shutdown unit that are connected to a direct current bus (where a positive end and a negative end of the direct current bus are indicated by BUS+ and BUS− respectively in FIG. 1).

The shutdown unit is a series circuit formed by connecting output ends of multiple shutdown circuits in series. Alternatively, the shutdown unit is a series-parallel circuit formed by connecting output ends of multiple shutdown circuits in series to form a series circuit, and connecting output ends of multiple such series circuits in parallel. An input end of each of the multiple shutdown circuits is connected to at least one of direct current power supplies in a distributed power generation system. In a case that an input end of any one of the multiple shutdown circuits is connected to multiple direct current power supplies, the multiple direct current power supplies may be connected in series, parallel or series-parallel. It can be seen from the above, each of the direct current power supplies in the distributed power generation system is provided with a shutdown circuit. Any one of the shutdown circuits may be provided to one direct current power supply, or may be shared by multiple direct current power supplies.

The shutdown control system may be applied to a distributed power generation system using photovoltaic modules as the direct current power supplies (hereinafter referred to as a photovoltaic system). The shutdown control system may also be applied to a distributed power generation system using storage batteries, super capacitors or fuel batteries as the direct current power supplies, which is not limited herein. In an example shown in FIG. 1, the shutdown control system is applied to a photovoltaic system including two series circuits, and each of the photovoltaic modules is provided with one shutdown circuit separately.

The electrical energy transforming unit is an important device in the distributed power generation system, because the turned-on state or the turned-off state of the electrical energy transforming unit directly determines the power generation state or shutdown state of the distributed power generation system. The electrical energy transforming unit may be an existing inverter or an existing energy storage converter in the distributed power generation system, which is described in detail as follows.

The electrical energy transforming unit may be a grid-connected inverter connected between a direct current bus and a grid. For example, in the photovoltaic system shown in FIG. 1, in a case that the grid-connected inverter operates in a grid-connected operation condition, electrical energy on the direct current bus is transmitted to the grid, such that the photovoltaic system operates in the power generation state. In a case that the grid-connected inverter stops operating in the grid-connected operation condition, the photovoltaic system is in the shutdown state and no electrical energy is transmitted to the grid.

Alternatively, the electrical energy transforming unit may be an off-grid inverter connected between the direct current bus and a local load. For example, in the photovoltaic system shown in FIG. 1, in a case that the off-grid inverter performs energy transformation, the electrical energy on the direct current bus is transmitted to the local load, such that the photovoltaic system operates in the power generation state. In a case that the off-grid inverter stops performing the energy transformation, the photovoltaic system is in the shutdown state.

Alternatively, the electrical energy transforming unit may be an energy storage converter connected between the direct current bus and a storage battery pack. For example, in the photovoltaic system shown in FIG. 1, in a case that the energy storage converter performs the energy transformation, the electrical energy on the direct current bus is stored in the storage battery pack, such that the photovoltaic system operates in the power generation state. In a case that the energy storage converter stops performing the energy transformation, the photovoltaic system is in the shutdown state.

The control circuit of the shutdown control system includes a system control unit (SCU), a transformation control unit (TCU) and multiple power source control units (PCU) corresponding to the multiple shutdown circuits. The multiple shutdown circuits may correspond to the multiple PCUs in one-to-one manner, as shown in FIG. 1. Alternatively, several of the multiple shutdown circuits may correspond to one of the multiple PCUs.

The SCU is configured to periodically transmit a first communication signal, and stop transmitting the first communication signal when receiving a first user command. The TCU is configured to control the turned-on state and the turned-off state of the electrical energy transforming unit. Each of the multiple PCUs is configured to determine whether a first condition that the PCU receives the first communication signal from the SCU during a preset time period is met and whether a second condition that the distributed power generation system operates in the power generation state is met. If determining that at least one of the first condition and the second condition is met, the PCU is configured to control a shutdown circuit corresponding to the PCU to operate in a normal operation mode. If determining that none of the first condition and the second condition is met, the PCU is configured to control the shutdown circuit corresponding to the PCU to operate in a security mode.

The security mode and the normal operation mode of the shutdown circuit are defined based on whether the shutdown circuit performs electrical shock protection or not. The normal operation mode is a mode other than the security mode.

In some embodiments, in the normal operation mode, the distributed power generation system is controlled to normally operate as required without regarding a risk of electric shock. For example, the distributed power generation system operates at maximum power or limited power or is on standby based on the actual conditions.

In the security mode, an output voltage of the shutdown circuit is limited, such that an output voltage (hereinafter referred to as a string voltage) of the series circuit falls within a security voltage range, so as to avoid an electric shock accident when a worker is closed to the distributed power generation system. The limited output voltage of the shutdown circuit is determined based on actual conditions. For example, according to the US NEC 2017, a photovoltaic system mounted on a building is required to have a rapid shutdown function, and after the photovoltaic system is turned off, a voltage of an electric conductor located beyond a distance of 0.3 m from the photovoltaic system should not exceed a value of 30V. In this case, for a series circuit formed by connecting 22 shutdown circuits in series, each of the shutdown circuits may operate in a security mode in which an output voltage of the shutdown circuit is less than 1V, such that the string voltage does not exceed a value of 22V, satisfying the security requirement of 30V.

It can be seen from the above that, the SCU periodically transmits the first communication signal, to control the shutdown circuit to operate in the security mode. The SCU stops transmitting the first communication signal, to control the shutdown circuit to operate in the normal operation mode. If the SCU transmits the first communication signal in a cycle of T2, and the preset time period is T1, then T1 is greater than T2, i.e., T1>T2. In a case that a communication link between each of the multiple PCUs and the SCU is well, the PCU can accurately determine the target operation mode of the shutdown circuit corresponding to the PCU based on the first communication signal transmitted from the SCU. In a case that the communication link between the PCU and the SCU is broken, the PCU can still properly determine the target operation state of the shutdown circuit corresponding to the PCU based on an operation state of the distributed power generation system. If it is determined that the distributed power generation system is in the shutdown state, the shutdown circuit is controlled to operate in the security mode, so as to eliminate a risk of electric shock. If it is determined that the distributed power generation system operates in the power generation state, the shutdown circuit is controlled to operate in the normal operation mode, so as to ensure the usability of the distributed power generation system. In this way, the usability of the distributed power generation system is significantly improved, compared with the case that the shutdown circuit is directly controlled to operate in the security mode once the communication link is broken.

In some embodiments of the present disclosure, the PCU is configure to control the shutdown circuit to operate in the security mode by a way of controlling the shutdown circuit to operate in a security mode in which the output voltage value of the shutdown circuit is equal to zero, or controlling the shutdown circuit to operate in a security mode in which the output voltage value of the shutdown circuit is not equal to zero, which are described in detail below.

The controlling the shutdown circuit to operate in a security mode in which the output voltage value of the shutdown circuit is equal to zero may be implemented by at least the following three methods. In a first method, a voltage value of an input end of the shutdown circuit is controlled to be equal to an open circuit voltage value of a direct current power supply connected to the input end of the shutdown circuit. In this case, an output current value of the direct current power supply connected to the input end of the shutdown circuit is equal to zero, and thus there is no electrical energy transmitted to the output end of the shutdown circuit, thereby avoiding the electric shock accident. In a second method, the current value of the input end of the shutdown circuit is controlled to be equal to a short circuit current value of the direct current power supply connected to the input end of the shutdown circuit. In this case, the voltage value of the input end of the shutdown circuit is equal to zero, and thus there is no electrical energy transmitted to the output end of the shutdown circuit, thereby avoiding the electric shock accident. In a third method, the input end of the shutdown circuit is disconnected from the output end of the shutdown circuit, or the shutdown circuit is controlled to be turned off.

The controlling the shutdown circuit to operate in a security mode in which the output voltage value of the shutdown circuit is not equal to zero may be implemented by at least the following two methods. In a first method, the voltage value of the input end (or the output end) of the shutdown circuit is controlled to be kept at a preset value not equal to zero. In a second method, the voltage value of the input end (or the output end) of the shutdown circuit is controlled to periodically change in a preset range.

It should be noted that, the security modes of the multiple shutdown circuits in a same shutdown control system may be implemented by different methods or by a same method, which is not limited herein. Normally, the PCU is powered by a direct current power supply on a front end of the corresponding shutdown circuit. In a case that the direct current power supply cannot supply power to the PCU (for example, in a case that the current value of the input end of the shutdown circuit is controlled to be equal to the short circuit current value of the direct current power supply connected to the input end of the shutdown circuit), the PCU may be powered by another direct current power supply that is not short-circuited or by an additional storage battery.

A topology of the shutdown circuit is described below. The shutdown circuit includes a switching device to switch between the operation modes of the shutdown circuit.

Figure 2:
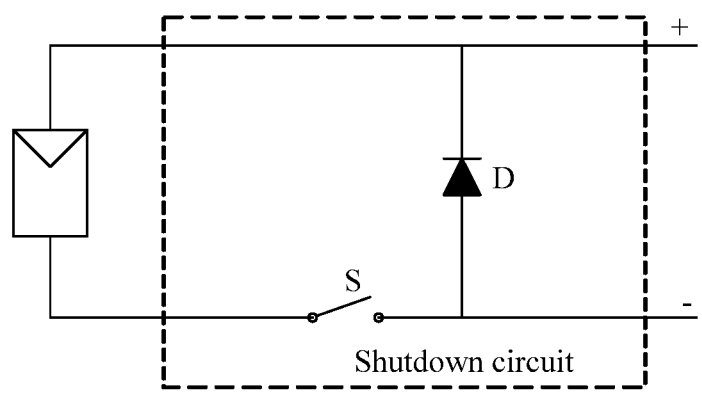
FIG. 2 is a schematic structural diagram of a shutdown circuit according to an embodiment of the present disclosure.

For example, in the topology shown in FIG. 2, a shutdown circuit includes a switch S and a diode D. The switch S is connected between an input end and an output end of the shutdown circuit. The diode D is connected to the output end of the shutdown circuit in inverse-parallel. The operation principle of the shutdown circuit is described as follows. When the switch S is turned on, the input end is connected to the output end of the shutdown circuit, such that the shutdown circuit operates in the normal operation mode. When the switch S is turned off, a current loop between the input end and the output end of the shutdown circuit is cut off, such that the shutdown circuit operates in the security mode in which an output voltage value of the shutdown circuit is equal to zero. Alternatively, the switch S is turned on and off alternately (for example, in a pulse width modulation (PWM) manner with a fixed duty cycle or in a hysteresis comparing PWM manner), to alternately connect and disconnect the input end and the output end of the shutdown circuit, so as to output a smooth waveform in cooperation with an inductor and a capacitor (or a parasitic capacitance and a parasitic inductance), such that a voltage value of the output end of the shutdown circuit is kept at a preset value. The diode D is used to provide a bypass path for a current of a series circuit when the switch S is turned off.

Alternatively, the switch S may be connected in parallel to the input end or the output end of the shutdown circuit. When the switch S is turned off, the shutdown circuit operates in the normal operation mode. When the switch S is turned on, the voltage value of the output end of the shutdown circuit is reduced to zero. Alternatively, the switch S is turned on and off alternately, such that the voltage value of the output end of the shutdown circuit is kept at a preset value.

Alternatively, the shutdown circuit may be a DC/DC converter, such as a buck converter, a boost converter, or a buck-boost converter. The DC/DC converter may be switched to the normal operation mode or the security mode by controlling a state of a switch in the DC/DC converter.

The SCU may be a physically separated device, as shown in FIG. 1. Alternatively, the SCU may be integrated into an existing device of the distributed power generation system to improve the integration level of the distributed power generation system and reduce cost. For example, the SCU is integrated into the electrical energy transforming unit.

Each of the PCUs may include a receiver, a sampling circuit, and a controller. The receiver is configured to receive the first communication signal transmitted from the SCU, and transmit the received first communication signal to the controller. The sampling circuit is configured to collect related electrical parameters and transmit the collected electrical parameters to the controller. The controller is configured to determine an operation state of the distributed power generation system based on received electrical parameters and analyze the first communication signal transmitted from the SCU, to determine whether to control the shutdown circuit to operate in the normal operation mode or the security mode, and generates a control signal corresponding to the determined mode to control the operation of the shutdown circuit.

The PCU may determine the operation state of the distributed power generation system based on received electrical parameters by the following three solutions.

Solution 1

In a case that the distributed power generation system operates in the power generation state, the electrical energy transforming unit performs energy transformation, so that the direct current power supply outputs power to the direct current bus. In a case that the distributed power generation system is in the shutdown state, the direct current power supply stops outputting power to the direct current bus. Therefore, the PCU may detect whether the direct current power supply outputs power to the direct current bus by detecting input parameters or output parameters (the PCU may acquire the input parameters or output parameters by sampling by itself or communicating with another PCU) of the shutdown circuit, so as to detect the operation state of the distributed power generation system. For example, in a case that an output current value or an output power value of each of the direct current power supplies is equal to zero, or a voltage value of each of the direct current power supplies is equal to an open circuit voltage value (in this case, an output current value of each of the direct current power supplies is also equal to zero), the PCU may determine that the distributed power generation system is in the shutdown state by detecting an output current value of a shutdown circuit corresponding to the PCU. Alternatively, each of the multiple PCUs may acquire power generation information of other direct current power supplies by communicating with other PCUs in the shutdown control system. If a PCU obtains that none of the other direct current power supplies outputs power to the direct current bus and the PCU itself does not output power to the direct current bus, the PCU determines that the distributed power generation system is in the shutdown state. Alternatively, if an output current value or an output power value of any shutdown circuit is equal to zero, or an output voltage value of any shutdown circuit is equal to an output open circuit voltage value of the shutdown circuit, it is determined that the direct current power supply does not transmit electrical energy to the direct current bus, and the distributed power generation system is in the shutdown state.

Solution 2

A signal having a specific frequency may be generated when an electrical energy transforming device performs the energy transformation. For example, a switching frequency of 16 kHz may be generated when a switch in an energy storage converter operates, or a frequency of a multiple of 50 kHz may be generated on the direct current bus when a grid-connected inverter operates in the grid-connected operation condition. Information of the frequency is reflected in an output voltage and an output current of each of the multiple shutdown circuits. Therefore, parameters of the output voltage or the output current of the shutdown circuit may be collected to analyze information of a specific frequency therein. If it is detected that an intensity of a signal having the specific frequency (i.e., an intensity of a voltage or a current having the specific frequency) is high enough, for example, higher than a threshold, it is indicated that the electrical energy transforming device performs the energy transform, that is, the distributed power generation system operates in the power generation state. If it is detected that an intensity of the signal having the specific frequency is low, it is indicated that the electrical energy transforming unit does not perform the energy transform, that is, the distributed power generation system is in the shutdown state. With the method of determining the operation state by using the specific frequency, it can be avoided that when the distributed power generation system is in the shutdown state, the PCU wrongly determines that the distributed power generation system operates in the power generation state due to a circulation current between the series circuits.

Solution 3

The operation state may be determined by determining a time-domain mutation feature in the output voltage or the output current of the shutdown circuit. If a predetermined time-domain mutation feature occurs in the output voltage or the output current of the shutdown circuit, it is determined that the distributed power generation system is in the shutdown state. For example, if it is detected that the output current of the shutdown circuit suddenly drops from a value of 5 A to 0 A during 0.1 s, it may be determined that the distributed power generation system is in an emergency shutdown state.

In some applications, the PCU may further include a transmitter. The controller transmits a communication signal via the transmitter. In this case, the PCU generally has a device identification (ID). IDs of the multiple PCUs are different from each other. The ID of the PCU may be an identification number, such as an identification number of 1706031234 including a date and a serial number, which is prestored in the PCU in the factory. Alternatively, the ID of the PCU may be an identification number manually set when being used, such as an identification number inputted via a dip switch, a push button, a touch screen on the PCU or via a master computer for communication interaction in the PCU. Alternatively, the ID of the PCU may be a communication address dynamically assigned based on a communication network, such as a communication address ranging from 001 to 255 dynamically assigned based on a Modbus protocol. If a first communication signal including an ID of a PCU and requesting a response is received by the receiver and is recognized by the controller of the PCU, the transmitter transmits a response communication signal. The response communication signal generally includes the ID of the PCU. Each of other PCUs can also receive the first communication signal and control a corresponding shutdown circuit based on the first communication signal, but does not transmit a response to the first communication signal. In order to improve the integration level and reduce the cost, the transmitter and the receiver in a same PCU may share a part of a circuit, and multiple shutdown circuits may be controlled by a same PCU.

In some embodiments, the SCU may collect information of operation parameters of each of the direct current power supplies and each of the multiple shutdown circuits by receiving the response communication signal from each of the multiple PCUs, and then locally display the information of operation parameters via a display device (such as a light-emitting diode (LED) display screen). The SCU may also locally analyze the operation state of the distributed power generation system based on the information of operation parameters, so as to switch the operation state of the distributed power generation system or report a fault. Alternatively, the SCU may transmit the information of operation parameters to a data processing device of a higher level. For example, the SCU transmits the information of operation parameters to a cloud platform or a user terminal via the Internet, for data display and analysis at a higher level.

If two devices A and B use a same communication method, data transmitted from the device A can be received and analyzed by the device B. Therefore, the SCU may use a same communication method as each of the multiple PCUs. For example, the SCU and each of the multiple PCUs are coupled to a direct current power line (the way that the SCU is connected between a positive end and a negative end of the direct current power line as shown in FIG. 1 is exemplary only, the SCU may be coupled to the direct current power line via a current transformer in practice), and communicates to each other in a manner of power line carrier (PLC) communication. Alternatively, the multiple PCUs may use different communication methods, and the SCU is capable of communicating with the multiple PCUs using different communication methods.

Further, if three devices A, B and C use a same communication method, communication collision may occur in a case that the device A and the device C simultaneously transmit data to the device B. Therefore, in a case that the SCU and each of the multiple PCUs use a same communication interval and each of the multiple PCUs is required to respond to the first communication signal, an anti-collision mechanism is required to avoid the communication collision caused by multiple PCUs simultaneously transmitting response communication signals to the SCU. For example, The SCU may transmit a first communication signal including an ID of a PCU to the multiple PCUs in an ID polling manner. Each of the multiple PCUs analyzes information of the ID in the first communication signal after receiving the first communication signal, compares the ID in the first communication signal with its own ID. If the ID in the first communication signal is identical to its own ID, the PCU transmits a response communication signal including its own ID to the SCU. In this way, different PCUs may transmit response communication signals at different time periods. Therefore, there is only one PCU transmits a response communication signal in each time period, thereby avoiding the communication collision.

In addition, it should be noted that when the SCU stops transmitting the first communication signal, The SCU can still transmit other communication signal (which may be referred to as a second communication signal), as long as the second communication signal differs from the first communication signal. The second communication signal may differs from the first communication signal in instructions included in the communication signals. For example, the first communication signal includes an instruction indicating the normal operation mode, while the second communication signal includes an instruction indicating the security mode. In this way, the SCU can not only acquire a response from the PCU by transmitting the first communication signal when the shutdown circuit operates in the normal operation mode, but also acquire a response from the PCU by transmitting the second communication signal when the shutdown circuit operates in the security mode. The SCU may transmit the second communication signal immediately upon stopping transmitting the first communication signal.

In an embodiment, each of the multiple PCUs is further configured to control a shutdown circuit corresponding to the PCU to operate in the security mode in a case that the PCU determines that the distributed power generation system is in the shutdown state and receives the second communication signal. In a case that the distributed power generation system is in the shutdown state, if the SCU instructs the shutdown circuit to operate in the security mode only by stopping transmitting the first communication signal, the PCU needs at least a time period of T1 to recognize the instruction from the SCU. However, if the SCU transmits the second communication signal within the time period T1, the PCU can more quickly recognize the instruction from the SCU.

It should be noted that the first communication signal or the second communication signal transmitted from the SCU each time includes only one ID of a given PCU, and only the PCU having the ID responses to the first communication signal or the second communication signal. However, all of the multiple PCUs in the distributed power generation system can receive the first communication signal or the second communication signal. Therefore, each of the multiple PCUs may determine a target operation state of the shutdown circuit corresponding to the PCU by analyzing instructions included in the first communication signal or the second communication signal transmitted from the SCU all the time, rather than determining based on only the first communication signal or the second communication signal including its own ID.

In any one of the above disclosed embodiments, the TCU may determine whether to control the electrical energy transforming unit to be turned on or turned off based on electrical parameters detected by the TCU itself. For example, the TCU may determine whether the grid-connected inverter satisfies a grid-connected condition by detecting related electrical parameters. If it is determined that grid-connected inverter satisfies the grid-connected condition, the TCU controls the grid-connected inverter to be turned on. Alternatively, the TCU may determine whether to control the electrical energy transforming unit to be turned on or turned off based on a user command transmitted from the external. For example, the TCU controls the electrical energy transforming unit to be shut down in response to a first user command transmitted from the external. Alternatively, the TCU may determine whether to control the electrical energy transforming unit to be turned on or turned off based on a command transmitted from the SCU. For example, the SCU instructs, when receiving the first user command, the TCU to control the electrical energy transforming unit to be shut down. In this case, the communication method used between the SCU and the PCU may be identical or not identical to the communication method used between the SCU and the TCU. For example, the SCU communicates with the PCU in a manner of PLC communication, while the SCU communicates with the TCU in a manner of wireless fidelity (WIFI) communication, RS485 communication or the like.

Corresponding to the above embodiments of the shutdown control system, a shutdown control method applied to the shutdown control system is further provided according to an embodiment of the present disclosure. The shutdown control system includes a main circuit and a control circuit.

The main circuit includes an electrical energy transforming unit and a shutdown unit that are connected to a direct current bus. The shutdown unit is a series circuit formed by connecting output ends of multiple shutdown circuits in series. Alternatively, the shutdown unit is a series-parallel circuit formed by connecting output ends of multiple shutdown circuits in series to form a series circuit and connecting output ends of multiple such series circuits in parallel. An input end of each of the multiple shutdown circuits is connected to at least one of direct current power supplies in a distributed power generation system. When the electrical energy transforming unit operates in a turned-on state, the distributed power generation system operates in a power generation state, and when the electrical energy transforming unit operates in a turned-off state, the distributed power generation system operates in a shutdown state.

The control circuit includes a system control unit (SCU), a transformation control unit (TCU) and multiple power source control units (PCU) corresponding to the multiple shutdown circuits. The SCU is configured to periodically transmit a first communication signal. The SCU stops transmitting the first communication signal when receiving a first user command. The TCU is configured to control the turned-on state and the turned-off state of the electrical energy transforming unit.

Figure 3:
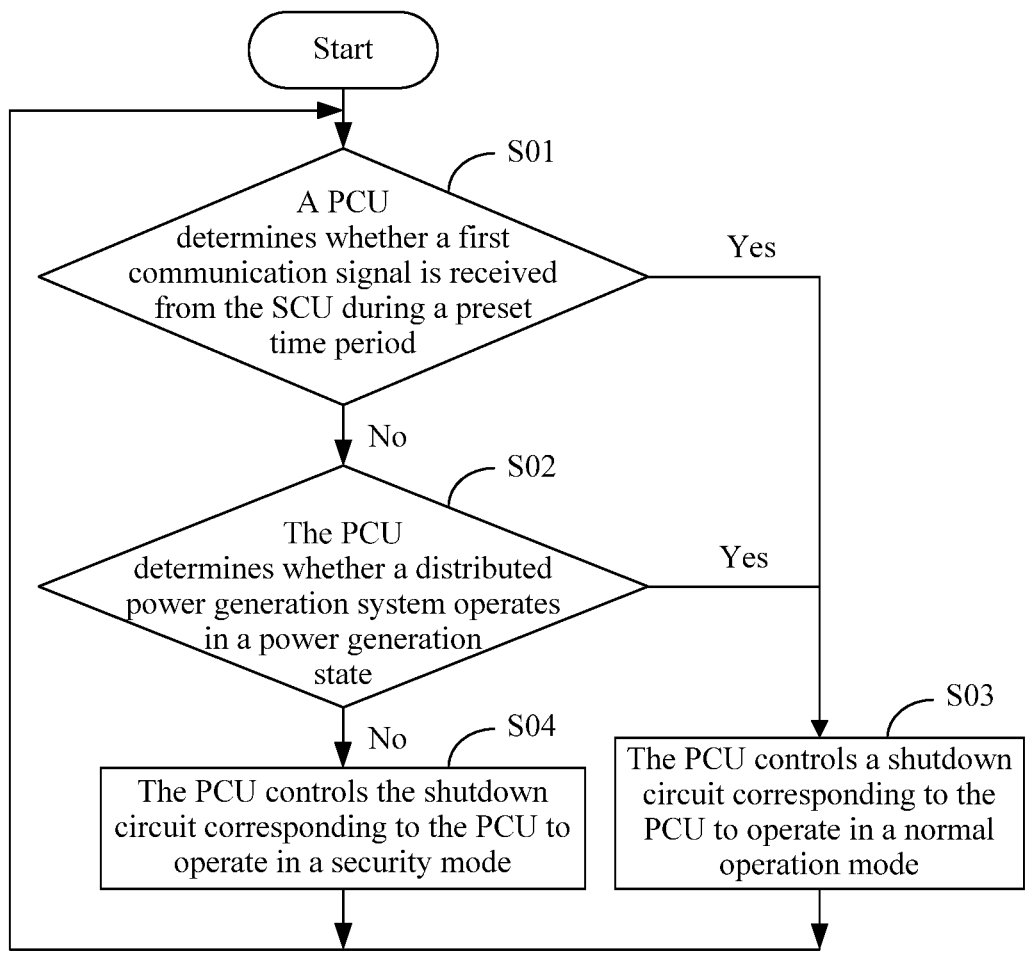
FIG. 3 is a flowchart of a shutdown control method according to an embodiment of the present disclosure.

Referring to FIG. 3, the shutdown control method includes the following steps S01 to S04.

In step S01, each of the multiple PCUs determines whether the PCU receives the first communication signal from the SCU during a preset time period. If it is determined that the PCU receives the communication signal from the SCU during the preset time period, the shutdown control method proceeds to step S03. If it is determined that the PCU does not receive the communication signal from the SCU during the preset time period, the shutdown control method proceeds to step S02.

In step S02, the PCU determines whether the distributed power generation system operates in the power generation state. If the PCU determines that the distributed power generation system operates in the power generation state, the shutdown control method proceeds to step S03. If the PCU determines that the distributed power generation system is not in the power generation state, the shutdown control method proceeds to step S04.

In step S03, the PCU controls a shutdown circuit corresponding to the PCU to operate in a normal operation mode.

In step S04, the PCU controls the shutdown circuit corresponding to the PCU to operate in a security mode.

In the security mode, an output voltage of the shutdown circuit is limited, to allow an output voltage of the series circuit to fall within a security voltage range. The normal operation mode is a mode other than the security mode.

In an embodiment, the first communication signal is used to request a response communication signal from the PCU.

In an embodiment, the SCU is further configured to transmit a second communication signal after stopping transmitting the first communication signal. Each of the first communication signal and the second communication signal is used to request a response communication signal from the PCU.

The embodiments in this specification are described in a progressive way, each of which emphasizes the differences from others, and for the same or similar parts, the embodiments can be referred to each other. Since the shutdown control method corresponds to the shutdown control system, the description of the shutdown control method is relatively simple, and for specific control logics involved in the shutdown control method, references may be made to the description of the shutdown control system.

The relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent to the process, method, article or device. Unless expressively limited otherwise, the statement "comprising (including) one . . . " does not exclude the case that other similar elements may exist in the process, method, article or device.

The description of the embodiments disclosed above enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein, but is in accordance with the widest scope consistent with the principles and novel features disclosed herein.

The invention claimed is:

1. A shutdown control system, comprising:
a main circuit comprising an electrical energy transforming unit and a shutdown unit that are connected to a direct current bus, wherein the shutdown unit is a series circuit formed by connecting output ends of a plurality of shutdown circuits in series or a series-parallel circuit formed by connecting output ends of a plurality of shutdown circuits in series to form a series circuit and connecting output ends of a plurality of the series circuits in parallel, an input end of each of the plurality of shutdown circuits is connected to at least one of direct current power supplies in a distributed power generation system, when the electrical energy transforming unit operates in a turned-on state, the distributed power generation system operates in a power generation state, and when the electrical energy transforming unit operates in a turned-off state, the distributed power generation system operates in a shutdown state; and
a control circuit comprising a system control unit (SCU), a transformation control unit (TCU) and a plurality of power source control units (PCUs) corresponding to the plurality of shutdown circuits, wherein
the SCU is configured to periodically transmit a first communication signal and stop transmitting the first communication signal when receiving a first user command;
the TCU is configured to control the turned-on state and the turned-off state of the electrical energy transforming unit;
each of the plurality of PCUs is configured to determine whether a first condition that the PCU receives the first communication signal from the SCU during a preset time period is met and determine whether a second condition that the distributed power generation system operates in the power generation state is met according to a sampled electrical parameter of a shutdown circuit of the plurality of shutdown circuits, control a shutdown circuit corresponding to the PCU to operate in a normal operation mode if determining that at least one of the first condition and the second condition is met; and control the shutdown circuit corresponding to the PCU to operate in a security mode if determining that none of the first condition and the second condition is met; and in the security mode, an output voltage of the shutdown circuit is limited, to allow an output voltage of the series circuit to fall within a security voltage range, and the normal operation mode is a mode other than the security mode.

2. The shutdown control system according to claim 1, wherein the first communication signal is used to request a response communication signal from the PCU.

3. The shutdown control system according to claim 2, wherein the SCU is further configured to transmit a second communication signal after stopping transmitting the first communication signal, wherein the second communication signal is used to request a response communication signal from the PCU.

4. The shutdown control system according to claim 3, wherein each of the plurality of PCUs is further configured to control the shutdown circuit corresponding to the PCU to operate in the security mode if determining that the distributed power generation system is in the shutdown state and the PCU receives the second communication signal.

5. The shutdown control system according to claim 1, wherein each of the plurality of PCUs is configured to control the shutdown circuit corresponding to the PCU to operate in the security mode by a way of:

controlling a voltage value of the input end of the shutdown circuit to be equal to an open circuit voltage value of a direct current power supply connected to the input end of the shutdown circuit; or controlling a current value of the input end of the shutdown circuit to be equal to a short circuit current value of a direct current power supply connected to the input end of the shutdown circuit; or controlling the input end of the shutdown circuit to be disconnected from an output end of the shutdown circuit; or controlling the shutdown circuit to be turned off; or controlling a voltage value of the input end or an output end of the shutdown circuit to be equal to a nonzero constant value; or controlling a voltage value of the input end or an output end of the shutdown circuit to periodically change in a preset range.

6. The shutdown control system according to claim 5, wherein each of the plurality of shutdown circuits comprises a diode connected to an output end of the shutdown circuit in reverse-parallel, and a switch connected between the input end and the output end of the shutdown circuit or connected in parallel to the input end or the output end of the shutdown circuit; or each of the plurality of shutdown circuits is a direct current/direct current (DC/DC) converter.

7. The shutdown control system according to claim 1, wherein the electrical energy transforming unit is an existing inverter or an existing energy storage converter in the distributed power generation system.

8. The shutdown control system according to claim 7, wherein each of the plurality of PCUs is configured to determine that the distributed power generation system is in the shutdown state by determining that:

an output current value or an output power value of each of the direct current power supplies is equal to zero; or a voltage value of each of the direct current power supplies is equal to an open circuit voltage value of the direct current power supply; or an output current value or an output power value of the shutdown circuit corresponding to the PCU is equal to zero; or a voltage value of the output end of the shutdown circuit corresponding to the PCU is equal to an output open circuit voltage value of the shutdown circuit; or an intensity of a voltage or a current having a predetermined frequency at the output end of the shutdown circuit corresponding to the PCU is less than a preset value; or a predetermined time-domain mutation feature occurs in an output voltage or an output current of the shutdown circuit corresponding to the PCU.

9. A shutdown control method, applied to a shutdown control system comprising a main circuit and a control circuit, wherein the main circuit comprises an electrical energy transforming unit and a shutdown unit that are connected to a direct current bus, wherein the shutdown unit is a series circuit formed by connecting output ends of a plurality of shutdown circuits in series or a series-parallel circuit formed by connecting output ends of a plurality of shutdown circuits in series to form a series circuit and connecting output ends of a plurality of the series circuits in parallel, an input end of each of the plurality of shutdown circuits is connected to at least one of direct current power supplies in a distributed power generation system, when the electrical energy transforming unit operates in a turned-on state, the distributed power generation system operates in a power generation state, and when the electrical energy transforming unit operates in a turned-off state, the distributed power generation system operates in a shutdown state; and the control circuit comprises a system control unit (SCU), a transformation control unit (TCU) and a plurality of power source control units (PCU) corresponding to the plurality of shutdown circuits, wherein the SCU is configured to periodically transmit a first communication signal and stop transmitting the first communication signal when receiving a first user command, and the TCU is configured to control the turned-on state and the turned-off state of the electrical energy transforming unit, and wherein the shutdown control method comprises:

determining, by each of the plurality of PCUs, whether a first condition that the PCU receives the first communication signal from the SCU during a preset time period is met, and determining, by each of the plurality of PCUs, whether a second condition that the distributed power generation system operates in the power generation state is met according to a sampled electrical parameter of a shutdown circuit of the plurality of shutdown circuits;

controlling, by the PCU, a shutdown circuit corresponding to the PCU to operate in a normal operation mode if determining that at least one of the first condition and the second condition is met; and controlling, by the PCU, the shutdown circuit corresponding to the PCU to operate in a security mode if determining that none of the first condition and the second condition is met, wherein in the security mode, an output voltage of the shutdown circuit is limited, to allow an output voltage of the series circuit to fall within a security voltage range, and the normal operation mode is a mode other than the security mode.

10. The shutdown control method according to claim 9, further comprising:

transmitting, by the SCU, a second communication signal after stopping transmitting the first communication signal, wherein each of the first communication signal and the second communication signal is used to request a response communication signal from the PCU.

11. The shutdown control system according to claim 1, wherein each of the plurality of PCUs is configured to acquire the sampled electrical parameter by sampling by the PCU itself or by communicating with another PCU.

12. The shutdown control method according to claim 9, further comprising:

acquiring, by each of the plurality of PCUs, the sampled electrical parameter by sampling by the PCU itself or by communicating with another PCU.

* * * * *